(12) United States Patent
Yaginuma et al.

(10) Patent No.: US 10,877,592 B2
(45) Date of Patent: Dec. 29, 2020

(54) DISPLAY CONTROL DEVICE, DISPLAY CONTROL METHOD, AND DISPLAY CONTROL SYSTEM

(71) Applicant: PANASONIC INTELLECTUAL PROPERTY MANAGEMENT CO., LTD., Osaka (JP)

(72) Inventors: Masanobu Yaginuma, Kanagawa (JP); Yuichiro Nakamura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/579,012

(22) Filed: Sep. 23, 2019

(65) Prior Publication Data
US 2020/0104004 A1 Apr. 2, 2020

(30) Foreign Application Priority Data

Sep. 28, 2018 (JP) .................................. 2018-185816

(51) Int. Cl.
*G06F 3/041* (2006.01)
*G06F 3/14* (2006.01)

(52) U.S. Cl.
CPC .......... *G06F 3/0416* (2013.01); *G06F 3/1454* (2013.01)

(58) Field of Classification Search
CPC ............................. G06F 3/0416; G06F 3/1454
See application file for complete search history.

(56) References Cited

U.S. PATENT DOCUMENTS

| 9,851,895 | B2* | 12/2017 | Hwang | ................. G06F 3/1454 |
| 2015/0120817 | A1* | 4/2015 | Jeong | ..................... H04L 67/10 |
| | | | | 709/203 |
| 2018/0124151 | A1* | 5/2018 | Haizmann | ............. G06T 3/0006 |
| 2018/0203556 | A1* | 7/2018 | Karei | .................. G06F 3/03545 |

FOREIGN PATENT DOCUMENTS

| JP | 2007-147928 | 6/2007 |
| JP | 2015-152992 | 8/2015 |

* cited by examiner

*Primary Examiner* — Andrew Sasinowski
(74) *Attorney, Agent, or Firm* — Greenblum & Bernstein, P.L.C.

(57) ABSTRACT

A display control device according to one embodiment includes a processor. The processor receives image information indicating a first image appearing on a display from an information terminal, controls a first display device and a second display device based on the image information to display the first image on a first touch screen and a second touch screen, receives first coordinate information indicating a contact position on the first image from the first display device when a touch operation that brings a finger or an object into contact is performed in a range in which the first image is displayed in the first touch screen, overlays and displays a second image at a position corresponding to the first coordinate information on the first image displayed on the second touch screen when the first coordinate information is received, and transmits the received first coordinate information to the information terminal.

9 Claims, 10 Drawing Sheets

DISPLAY CONTROL DEVICE, DISPLAY CONTROL METHOD, AND DISPLAY CONTROL SYSTEM

CROSS-REFERENCE TO RELATED APPLICATIONS

This application is based upon and claims the benefit of priority from Japanese Patent Application No. 2018-185816, filed Sep. 28, 2018, the entire contents of which are incorporated herein by reference.

FIELD

The present disclosure relates to a display control device, a display control method, and a display control system.

BACKGROUND

Techniques have been known that transmit an operation performed on the touch screen of a sync device to a source device, using the mirroring technique that displays an image appearing on the display of a source device on the display of a sync device. Such a technique enables the user to perform the same operation as the operation on the display of the source device by operating the touch screen of the sync device.

Conventional techniques are described in Japanese Patent Application Laid-open No. 2015-152992 and Japanese Patent Application Laid-open No. 2007-147928, for example.

Unfortunately, in the conventional techniques, when an image is distributed from one information terminal to a plurality of display devices, individual operations performed on the image on the touch screens of the display devices may cause execution of an action unintended by users.

SUMMARY

The present disclosure provides a display control device, a display control method, and a display control system that can prevent execution of an action unintended by a user when individual operations are performed on touch screens of a plurality of display devices receiving distribution of an image from one information terminal.

A display control device according to the present disclosure is connected to an information terminal including a display, a first display device including a first touch screen, and a second display device including a second touch screen through a network, and includes a memory and a processor. The processor is configured to receive image information indicating a first image appearing on the display from the information terminal, control the first display device and the second display device based on the image information to display the first image on the first touch screen and the second touch screen, receive first coordinate information indicating a contact position on the first image from the first display device when a touch operation that brings a finger or an object into contact is performed in a range in which the first image is displayed in the first touch screen, overlay and display a second image at a position corresponding to the first coordinate information on the first image displayed on the second touch screen when the first coordinate information is received, and transmit the received first coordinate information to the information terminal.

DETAILED DESCRIPTION

Embodiments of a display control device, a display control method, and a display control system according to the present disclosure will be described below with reference to the drawings.

First Embodiment

Figure 1:
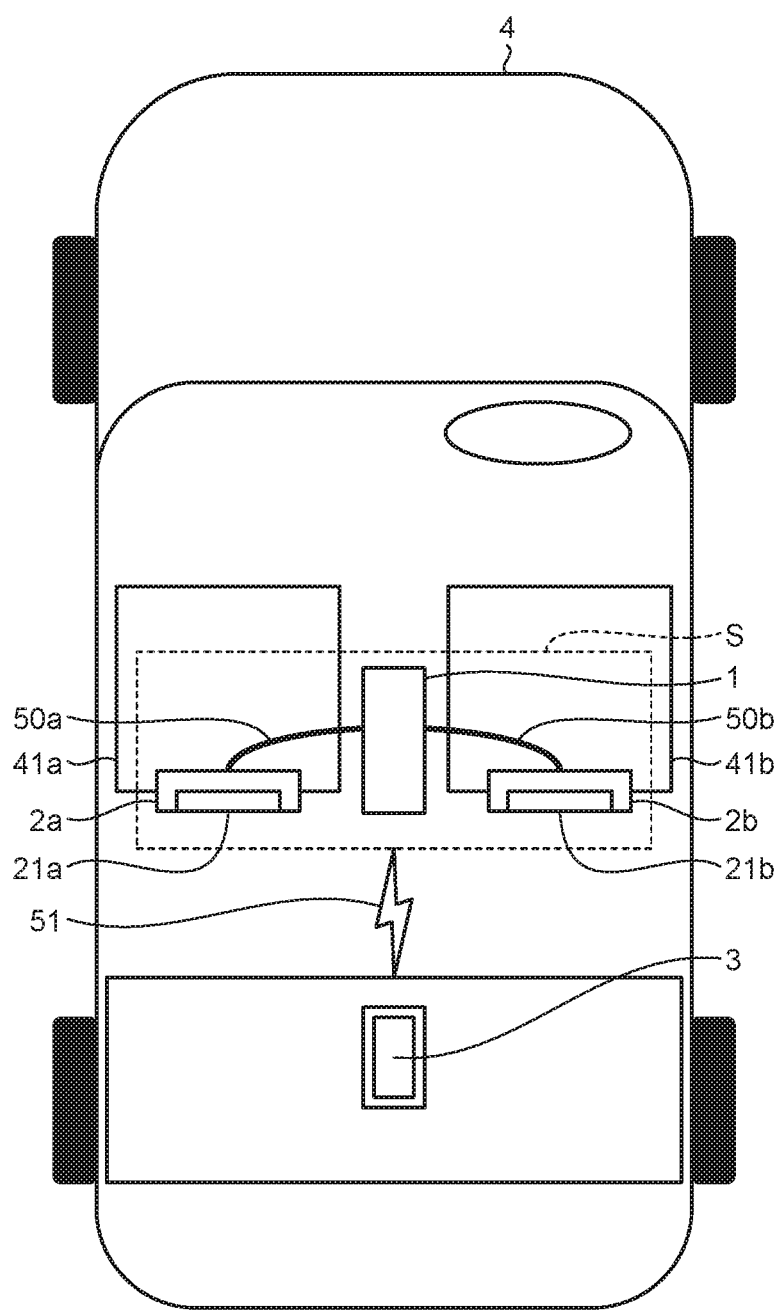
FIG. 1 is a diagram illustrating an exemplary vehicle equipped with a display control system according to a first embodiment.

FIG. 1 is a diagram illustrating an example of a vehicle 4 equipped with a display control system S according to the present embodiment. As illustrated in FIG. 1, the display control system S in the present embodiment includes a display control device 1, a first display device 2a, and a second display device 2b.

The first display device 2a and the second display device 2b in the present embodiment are rear seat monitors provided on the seatback of a passenger seat 41a and the seatback of a driver seat 41b, respectively, of the vehicle 4. The first display device 2a and the second display device 2b each include a touch screen that can be operated by a finger or a touch pen (stylus pen). The touch screen includes a display and a touch panel. In the present embodiment, the touch screen of the first display device 2a is referred to as first touch screen 21a, and the touch screen of the second display device 2b is referred to as second touch screen 21b. Hereinafter, the first display device 2a and the second display device 2b may be collectively referred to as display device 2. The first touch screen 21a and the second touch screen 21b may be collectively referred to as touch screen 21.

The display control device 1 is a computer that controls the first display device 2a and the second display device 2b to display, for example, moving images on the first display device 2a and the second display device 2b. The display control device 1 is connected with the first display device 2a and the second display device 2b via a wired network through cables 50a and 50b. Information communication of the display control device 1 with the first display device 2a and the second display device 2b employs, for example, a method such as IEEEBUS or gigabit video interface (GVIF).

The display control device 1 is connected with an information terminal 3 through a wireless network 51 such as Wi-Fi (registered trademark).

The first display device 2a and the second display device 2b display image data received from the information terminal 3 in the present embodiment. In the present embodiment, the display control device 1 displays an image appearing on the display of the information terminal 3 (hereinafter referred to as display image) on the touch screens 21 of the first display device 2a and the second display device 2b by mirroring technique such as Miracast (registered trademark). The display image is not limited to still images and may be moving images.

When the operation that brings a finger or an object into contact with a display image displayed by mirroring is performed on the touch screens 21 of the first display device 2a and the second display device 2b, the display control device 1 feeds back coordinate information indicating the position contacted by the finger or the object on the display image to the information terminal 3. The feed-back is performed by, for example, the user input back channel (UIBC) technique. When receiving the feedback of coordinate information from the display control device 1, the information terminal 3 performs the same action as when the finger or the object comes into contact with the position corresponding to the coordinate information on the display of the information terminal 3. This process enables the user to operate the information terminal 3 by operating the touch screen 21 of the first display device 2a or the second display device 2b.

As used herein the operation that brings a finger or an object into contact with the touch screen is referred to as touch operation. The position contacted by a finger or an object, that is, the position where a touch operation is performed is referred to as touch position.

The information terminal 3 is, for example, a smartphone or may be any devices that support mirroring standards such as Miracast (registered trademark), such as a tablet terminal or a laptop PC.

The display control system S in the present embodiment may be referred to as a rear sheet entertainment (RSE) system because it provides a passenger seated on the rear sheet with entertainment such as moving images distributed from the information terminal 3. The information terminal 3 is a distributor of images and may be referred to as a source device. The first display device 2a and the second display device 2b display an image distributed from the source device and may be referred to as a sync device.

Figure 2:
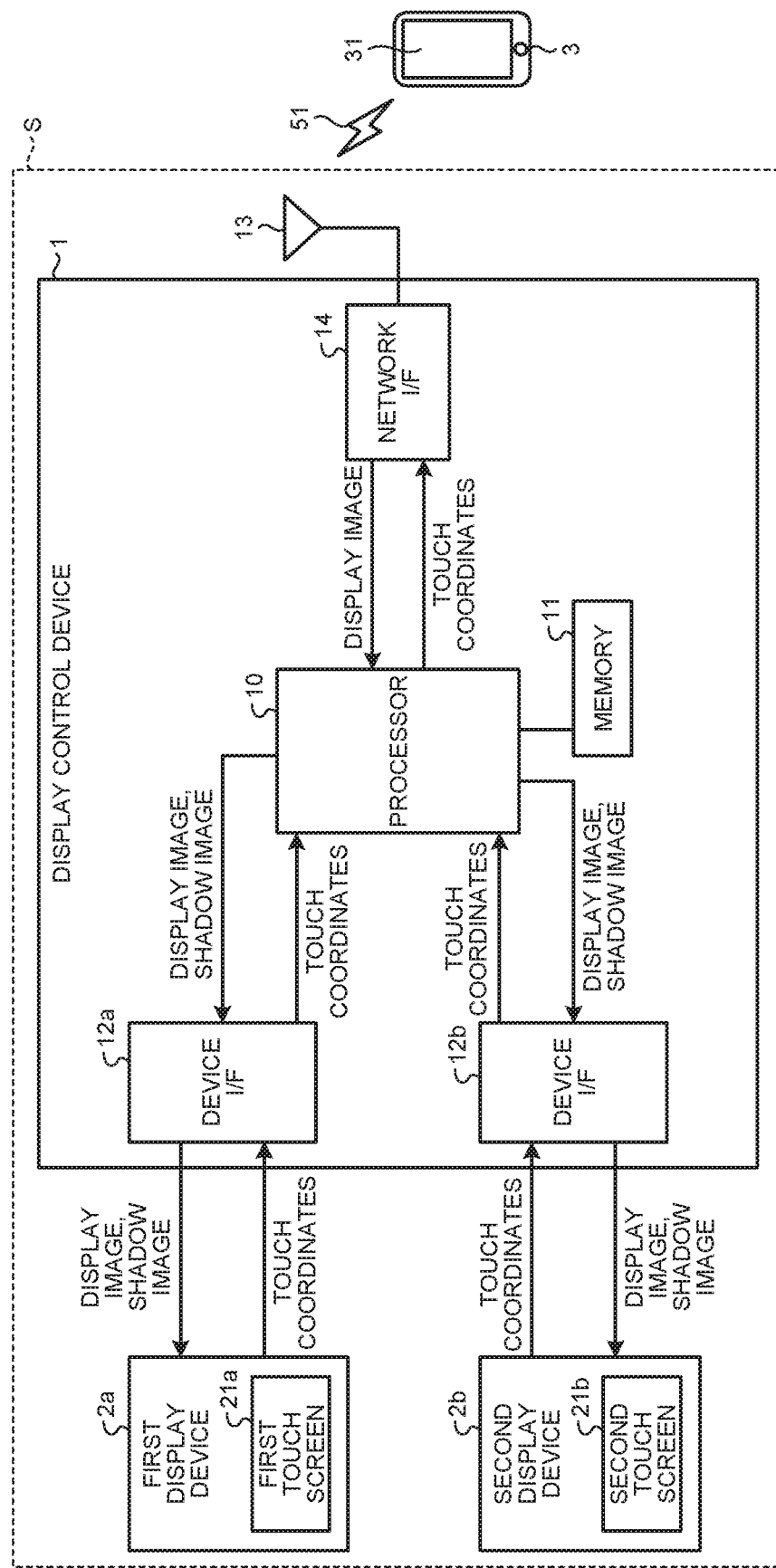
FIG. 2 is a diagram illustrating an exemplary hardware configuration of a display control device according to the first embodiment.

FIG. 2 is a diagram illustrating an exemplary hardware configuration of the display control device 1 according to the present embodiment. As illustrated in FIG. 2, the display control device 1 includes a processor 10, a memory 11, device interfaces (I/F) 12a and 12b, a network interface (I/F) 14, and a communication antenna 13.

The communication antenna 13 transmits/receives information to/from the information terminal 3 through the wireless network 51.

The network interface 14 is a module that performs network communication with the information terminal 3. For example, the network interface 14 transmits information received by the communication antenna 13 to the processor 10. In the present embodiment, the network interface 14 receives image information indicating a display image appearing on the display 31 of the information terminal 3 from the information terminal 3 through the communication antenna 13.

The network interface 14 transmits information output from the processor 10 to the communication antenna 13. In the present embodiment, the network interface 14 transmits touch coordinates indicating the touch position in the first touch screen 21a or the second touch screen 21b, in association with information identifying the touch-operated touch screen, from the processor 10 to the information terminal 3 through the communication antenna 13. The details of the touch coordinates will be described later.

The processor 10 controls the entire display control device 1. For example, the processor 10 reads and executes a variety of computer programs stored in the memory 11 to implement a variety of functions. In the present embodiment, the processor 10 controls the first display device 2a and the second display device 2b to display a display image transmitted from the information terminal 3 on the first touch screen 21a and the second touch screen 21b. The processor 10 generates a shadow image and displays the shadow image on the first touch screen 21a or the second touch screen 21b. As used herein the shadow image is an image representing a position contacted by the finger or the object (touch position) in a range in which a display image is displayed in another touch screen, which will be described in detail later.

The memory 11 is a storage configured to store a computer program executed in the processor 10 and a variety of data necessary for executing a process. The memory 11 is, for example, a ROM, a RAM, a flash memory, or an HDD.

The device interfaces 12a and 12b transmit/receive information to/from the first display device 2a or the second display device 2b. Specifically, the device interface 12a transmits, for example, image information indicating a display image output from the processor 10, image information indicating a shadow image, and a display position of the shadow image to the first display device 2a. The device interface 12a acquires touch coordinates in the first touch screen 21a of the first display device 2a from the first display device 2a and transmits the acquired touch coordinates to the processor 10. The device interface 12b transmits, for example, image information indicating a display image output from the processor 10, image information indicating a shadow image, and a display position of the shadow image to the second display device 2b. The device interface 12b acquires touch coordinates in the second touch screen 21b of the second display device 2b from the second display device 2b and transmits the acquired touch coordinates to the processor 10. Hereinafter, the device interfaces 12a and 12b may be simply collectively referred to as device interface 12. The device interface 12 is, for example, an integrated circuit (IC) configured to transmit/receive information with the IEEEBUS standards. However, embodiments are not limited thereto. The processor 10 may transmit/receive information to/from the first display device 2a or the second display device 2b, not through the device interface 12.

The details of the functions of the display control device 1 in the present embodiment will now be described.

Figure 3:
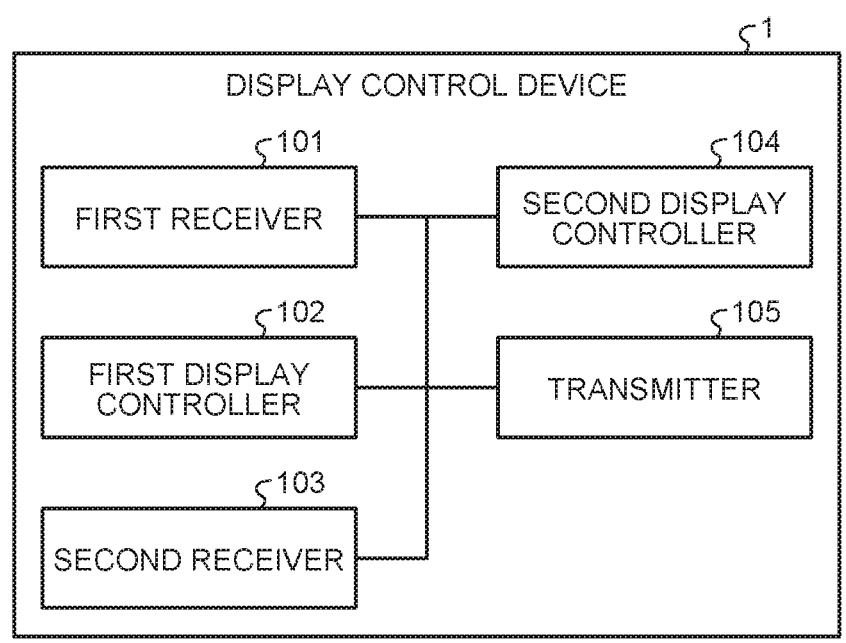
FIG. 3 is a block diagram illustrating an exemplary functional configuration of the display control device according to the first embodiment.

FIG. 3 is a block diagram illustrating an exemplary functional configuration of the display control device 1 according to the present embodiment. As illustrated in FIG. 3, the display control device 1 includes a first receiver 101, a first display controller 102, a second receiver 103, a second display controller 104, and a transmitter 105.

As an example, the first receiver 101, the first display controller 102, the second receiver 103, the second display controller 104, and the transmitter 105 are stored in the memory 11 and provided as a computer program in a format executable by a computer. The processor 10 reads and executes the computer program from the memory 11 to implement the function corresponding to each of the modules described above.

The computer program may be recorded and provided on a computer-readable recording medium such as a CD-ROM, a flexible disc (FD), a CD-R, and a digital versatile disc (DVD) in an installable or executable file format.

The computer program may be stored on a computer connected to a network such as the Internet and downloaded via the network. The computer program may be provided or distributed via a network such as the Internet.

The first receiver 101 receives image information indicating a display image appearing on the display 31 of the information terminal 3 from the information terminal 3 through the communication antenna 13 and the network interface 14. The first receiver 101 sends the received image information to the first display controller 102. The display image is an example of the first image in the present embodiment.

The first display controller 102 controls the first display device 2a and the second display device 2b based on the image information acquired by the first receiver 101 to display a display image on the first touch screen 21a and the second touch screen 21b.

Display of a display image will now be described with reference to FIG. 4.

Figure 4:
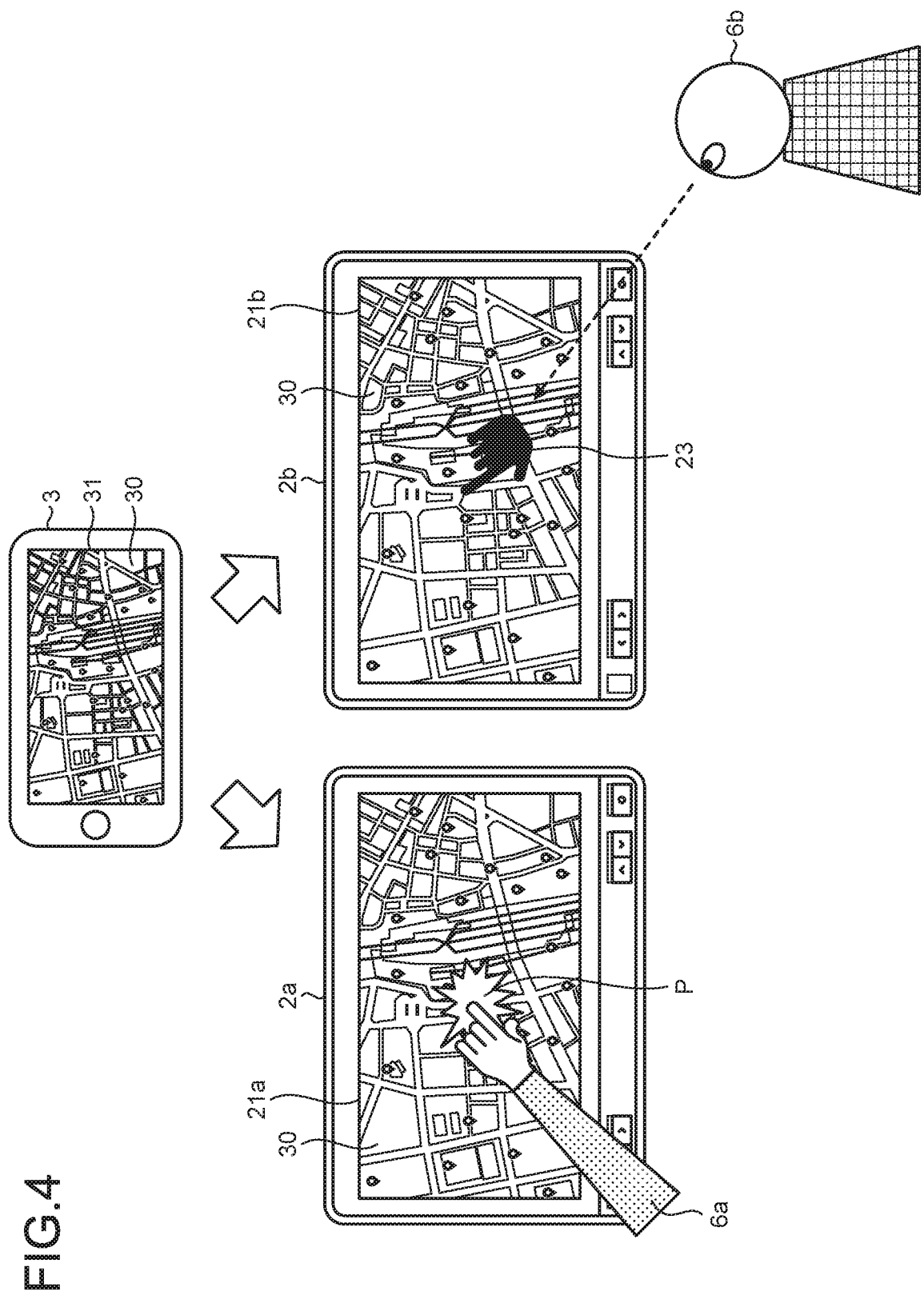
FIG. 4 is a diagram illustrating an example of screen display according to the first embodiment.

FIG. 4 is a diagram illustrating an example of screen display according to the present embodiment. As illustrated in FIG. 4, the first display controller 102 displays a display image 30 appearing on the display 31 of the information terminal 3, on the first touch screen 21a of the first display device 2a and the second touch screen 21b of the second display device 2b. This enables a user 6a using the first display device 2a and a user 6b using the second display device 2b to view an image similar to the display image 30 appearing on the display 31 of the information terminal 3. Hereinafter, the user 6a and the user 6b may be collectively referred to as user 6.

Returning to FIG. 3, when a touch operation is performed in a range in which the display image 30 is displayed in the first touch screen 21a or the second touch screen 21b (when a finger or an object comes into contact), the second receiver 103 receives touch coordinates indicating the touch position on the display image 30 from the first display device 2a or the second display device 2b. In doing so, the second receiver 103 receives the touch coordinates from the first display device 2a or the second display device 2b through the device interface 12a or 12b.

The touch coordinates is an example of first coordinate information or second coordinate information in the present embodiment.

For example, in the example illustrated in FIG. 4, the user 6a using the first display device 2a touches a touch position P on the display image 30 appearing on the first touch screen 21a. In this case, the second receiver 103 receives the touch coordinates indicating the touch position P on the display image 30. In this case, the second receiver 103 receives touch screen identification information that specifies the touch screen 21 being touch-operated.

In the example illustrated in FIG. 4, since the first touch screen 21a is being touch-operated, the second receiver 103 receives touch screen identification information indicating the first touch screen 21a and touch coordinates.

In the present embodiment, it is assumed that the touch screen identification information that specifies the touch screen 21 being touch-operated is transmitted by the display device 2 to the display control device 1.

In the present embodiment, it is assumed that when the range of the touch screen 21 in which the display image 30 is not displayed is touch-operated during mirroring, the display device 2 does not transmit the coordinates indicating the touch position of the touch operation to the display control device 1. For example, because of the difference between the image size of the display 31 of the information terminal 3 and the screen size of the touch screen 21 of the display device 2, there may be a range in which the display image 30 is not displayed on the touch screen 21. Since a touch operation in such a range is not the operation on the display image 30 or the operation for the information terminal 3, the display device 2 does not transmit the coordinates indicating the touch position of the touch operation to the display control device 1.

The second receiver 103 sends the received touch coordinates in association with the touch screen identification information that specifies the touch screen 21 being operated to the second display controller 104 and the transmitter 105.

Returning to FIG. 3, when the second receiver 103 receives the touch coordinates, the second display controller 104 overlays and displays a shadow image at a position corresponding to the touch coordinates on the display image 30, on the touch screen 21 provided in a display device 2 other than the source display device 2 that has transmitted the touch coordinates.

For example, as illustrated in FIG. 4, when the touch position P on the first touch screen 21a is touch-operated, the second display controller 104 overlays and displays a black shadow image 23 having a hand shape at a position corresponding to the touch position P on the display image 30 appearing on the second touch screen 21b.

Conversely to the example illustrated in FIG. 4, when the second touch screen 21b is being touch-operated, the second display controller 104 overlays and displays a shadow image 23 at a position corresponding to the touch position P on the display image 30 appearing on the first touch screen 21a. Although only the first touch screen 21a is being touch-operated in FIG. 4, the first touch screen 21a and the second touch screen 21b may be touch-operated simultaneously.

The shadow image 23 is an image representing a touch position in a range in which the display image 30 is displayed in another touch screen 21 and is an example of the second image in the present embodiment. The shadow image 23 is, for example, but not limited to, an icon image in the shape of hand, finger, touch pen, or arrow.

Returning to FIG. 3, when the second receiver 103 receives touch coordinates, the transmitter 105 transmits the received touch coordinates to the information terminal 3 through the network interface 14 and the communication antenna 13. In the information terminal 3 in the present embodiment, whether the touch operation is performed on the first touch screen 21a or the second touch screen 21b is not distinguished from each other. It is therefore assumed that the transmitter 105 does not transmit the touch screen identification information that specifies the touch screen 21 being touch-operated to the information terminal 3.

A display control process performed by the display control system S in the present embodiment configured as described above will now be described.

Figure 5:
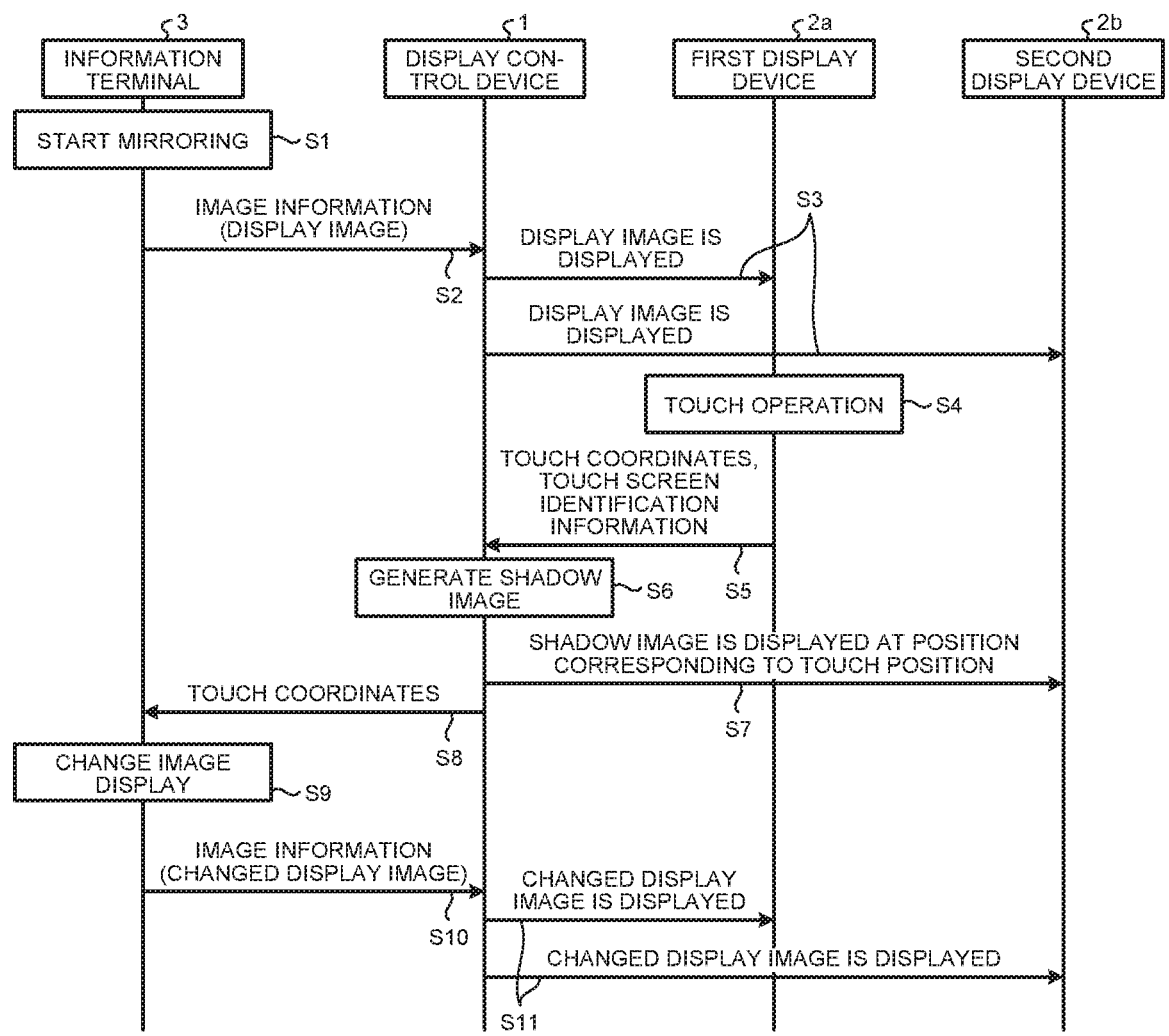
FIG. 5 is a sequence diagram illustrating an example of a display control process in the display control system according to the first embodiment.

FIG. 5 is a sequence diagram illustrating an example of the display control process in the display control system S according to the present embodiment.

For example, when accepting an operation by the user to start mirroring to the first display device 2a and the second display device 2b, the information terminal 3 starts mirroring (S1). The user operating the information terminal 3 may be the same user as the user 6 using the first display device 2*a* or the second display device 2*b* or may be a different user.

Upon starting mirroring, the information terminal 3 transmits image information indicating a display image 30 appearing on the display 31 of the information terminal 3 to the display control device 1 (S2). The first receiver 101 of the display control device 1 receives the image information transmitted from the information terminal 3.

Next, the first display controller 102 of the display control device 1 controls the first display device 2*a* and the second display device 2*b* based on the image information acquired by the first receiver 101 to display the display image 30 on the first touch screen 21*a* and the second touch screen 21*b* (S3).

Then, when the range in which the display image 30 is displayed is touch-operated in the first touch screen 21*a* of the first display device 2*a* (S4), the first display device 2*a* transmits touch coordinates indicating the touch position P in the display image 30 and touch screen identification information indicating the first touch screen 21*a* to the display control device 1 (S5). The second receiver 103 of the display control device 1 receives the touch coordinates and the touch screen identification information transmitted from the first display device 2*a*. The second receiver 103 sends the received touch coordinates and touch screen identification information in association with each other to the second display controller 104 and the transmitter 105.

Next, the second display controller 104 of the display control device 1 generates a shadow image 23 (S6). The second display controller 104 then overlays and displays the shadow image 23 at a position corresponding to the touch position P on the display image 30 on a touch screen 21 other than the touch-operated touch screen 21, based on the touch coordinates and the touch screen identification information. In this sequence diagram, since the first touch screen 21*a* is touch-operated, the second display controller 104 controls the second display device 2*b* to overlay and display the shadow image 23 at a position corresponding to the touch position P on the display image 30 appearing on the second touch screen 21*b* (S7).

The transmitter 105 of the display control device 1 transmits the touch coordinates received by the first receiver 101 to the information terminal 3 (S8). In other words, the transmitter 105 feeds back the touch operation performed by the user 6 on the display image 30 distributed from the information terminal 3 by mirroring to the information terminal 3.

The information terminal 3 then performs a variety of processing based on the touch coordinates transmitted from the display control device 1. As an example, the information terminal 3 changes screen display of the display 31 based on the touch coordinates transmitted from the display control device 1 (S9).

Next, the information terminal 3 transmits image information indicating the changed display image 30 to the display control device 1 (S10).

In FIG. 5, the process in the case where the first touch screen 21*a* is touch-operated has been described by way of example. However, the display control device 1 displays the shadow image 23 on the first touch screen 21*a* similarly when the second touch screen 21*b* is touch-operated. When the first touch screen 21*a* and the second touch screen 21*b* are operated simultaneously, the shadow image 23 indicating the touch position P in the first touch screen 21*a* appears on the second touch screen 21*b*, and the shadow image 23 indicating the touch position P in the second touch screen 21*b* appears on the first touch screen 21*a*.

In conventional techniques, when an image is distributed from one information terminal to a plurality of display devices, individual touch operations performed on the image in the touch screens of the display devices may cause execution of an action unintended by users.

For example, when a user performs a touch operation on a touch screen, another user may be performing a touch operation on the touch screen of another display device. In such a case, the information terminal 3 accepts the touch operations by both users, so that an action different from the action intended by the users may be executed in the information terminal 3.

Specifically, it is assumed that a user touches a point on the first touch screen and another user touches a point on the second touch screen. In this case, although the users recognize that they are performing the operation that touches a point, the information terminal 3 does not distinguish the first touch screen from the second touch screen and therefore accepts the operations as a two-point touch operation. For this reason, for example, when one of the users moves a finger touching on the touch screen with the intention of performing a swipe operation, the information terminal 3 accepts the operation as input of a pinch-in (reducing) or pinch-out (enlarging) operation. In this case, the action unintended by users is executed, and the users may mistake the action as a malfunction of the touch screen or the information terminal 3.

Since it is unknown what operation is being performed by another user on another touch screen, the operation performed by another user on another touch screen may change the display image, giving the user a feeling of strangeness.

By contrast, in the display control device 1 in the present embodiment, when a touch operation is performed in a range in which the display image 30 is displayed in the first touch screen 21*a*, the touch coordinates indicating the contact position on the display image 30 is received from the first display device 2*a*, and the shadow image 23 is overlaid and displayed at a position corresponding to the touch coordinates on the display image 30 appearing on the second touch screen 21*b*. With this configuration, the display control device 1 in the present embodiment allows the user 6*b* using the second touch screen 21*b* to recognize the touch position P1 on the first touch screen 21*a*, so that the user 6*b* can operate the second touch screen 21*b* while recognizing the operation of another user 6*a*. With this configuration, the display control device 1 in the present embodiment can prevent execution of an action unintended by the user 6*b* even when the display image 30 is distributed from one information terminal 3 to a plurality of display devices 2.

For example, in the display control device 1 in the present embodiment, the user 6*b* using the second touch screen 21*b* can wait for a touch operation when the first touch screen 21*a* is being touch-operated or can perform a touch operation in cooperation with the other user 6*a* while recognizing the touch position P of the other user 6*a* using the first touch screen 21*a*. As a result, execution of an action unintended by the user 6*b* is prevented.

Since the shadow image 23 in the present embodiment is an image representing the touch position in a range in which the display image 30 is displayed in another touch screen 21, the user 6 can easily become aware that another touch screen 21 is operated and the touch position P1 of an operation on another touch screen 21.

When a touch operation is performed in a range in which the display image 30 is displayed in the second touch screen 21*b*, the display control device 1 in the present embodiment receives the touch coordinates indicating the contact position on the display image 30 from the second display device 2b and overlays and displays the shadow image 23 at a position corresponding to the touch coordinates on the display image 30 appearing on the first touch screen 21a. With this configuration, the display control device 1 in the present embodiment allows the user 6a using the first touch screen 21a and the user 6b using the second touch screen 21b to mutually recognize the touch position P of the other user. With this configuration, when one of the touch screens 21 is being touch-operated, the display control device 1 in the present embodiment can prevent execution of an action unintended by the user 6 without performing exclusion control not to accept an operation on another touch screen 21. With this configuration, the display control device 1 in the present embodiment can prevent the user 6 from feeling strangeness because of the wait time for switching the exclusion control.

An example of the touch operation performed by users 6 using different touch screens 21 in cooperation with each other will now be described with reference to the drawings.

Figure 6:
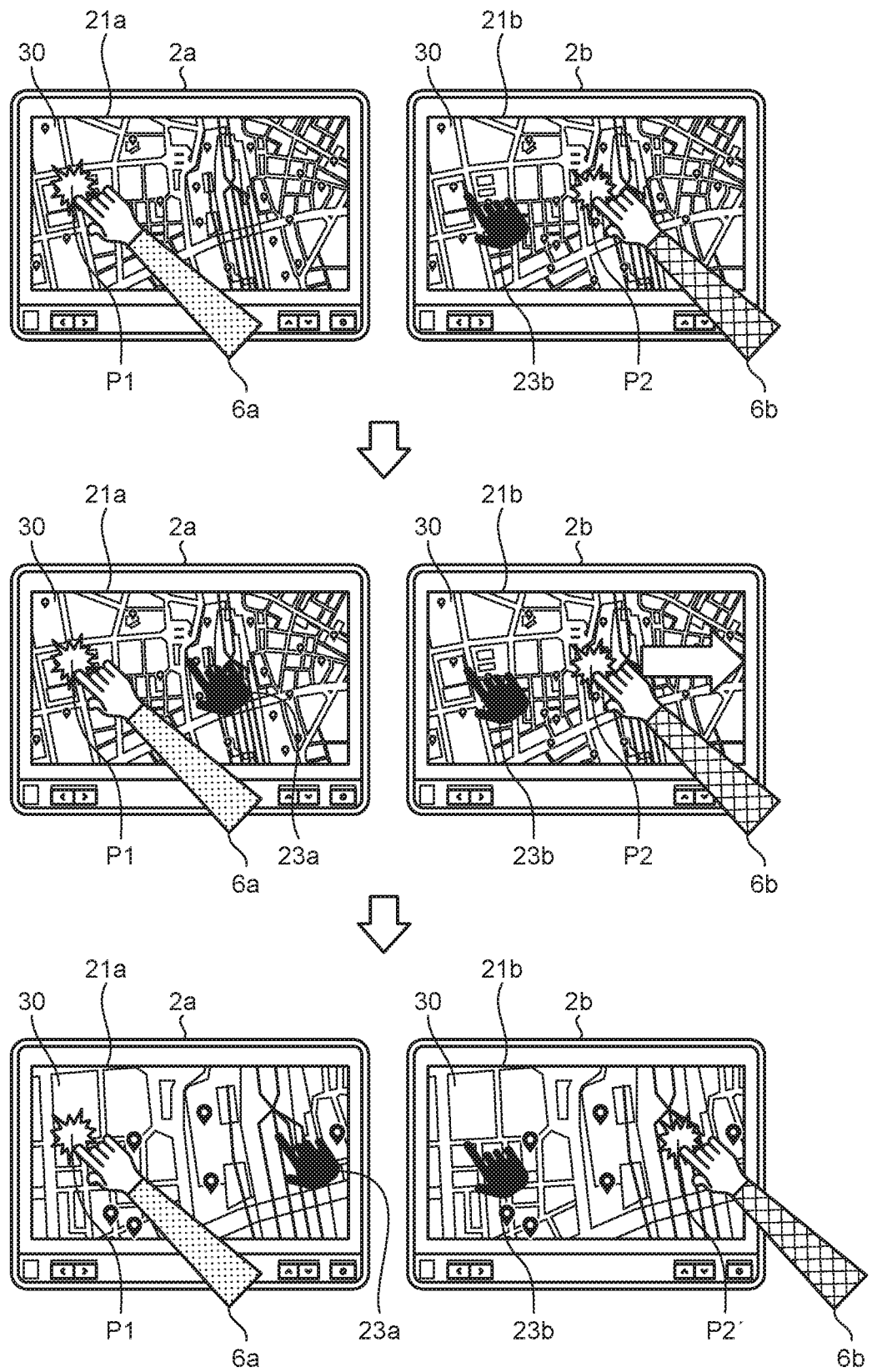
FIG. 6 is a diagram illustrating an example of time-series change of screen display of a first touch screen and a second touch screen according to the first embodiment.

FIG. 6 is a diagram illustrating an example of time-series change of screen display of the first touch screen 21a and the second touch screen 21b according to the present embodiment. As illustrated in FIG. 6, it is assumed that a display image 30 appears on the first touch screen 21a and the second touch screen 21b. First of all, as illustrated in the upper diagram in FIG. 6, it is assumed that the user 6a touch-operates the first touch screen 21a, for example, with a finger. The position touch-operated is a touch position P1. In this case, as illustrated in the upper diagram in FIG. 6, the display control device 1 displays a shadow image 23b at a position corresponding to the touch position P1 on the second touch screen 21b. The shadow image 23b allows the user 6b to recognize which position on the display image 30 is touch-operated by the user 6a.

Next, as illustrated in the upper diagram in FIG. 6, it is assumed that the user 6b touches the second touch screen 21b, for example, with a finger. The touched position is a touch position P2. In this case, as illustrated in the diagram at the middle in FIG. 6, the display control device 1 displays a shadow image 23a at a position corresponding to the touch position P2 on the first touch screen 21a. The shadow image 23a allows the user 6a to also recognize which position on the display image 30 is touch-operated by the user 6b.

Here, for example, as illustrated in the diagram at the middle in FIG. 6, it is assumed that the user 6b performs a swipe operation by moving the finger in a direction away from the shadow image 23b while keeping touching on the second touch screen 21b. As illustrated in the lower diagram in FIG. 6, it is assumed the position after movement is a touch position P2'. Such operation is the same operation for the information terminal 3 as when the user 6 touches two points on the display 31 and pinches out. As illustrated in the lower diagram in FIG. 6, the enlarged display image 30 then appears on the first touch screen 21a and the second touch screen 21b.

Since the shadow image 23a allows the user 6b to recognize the touch position P2 on the first touch screen 21a, the user 6b can perform an operation while grasping whether his/her swipe operation makes a pinch-out operation or a pinch-in operation. With this configuration, the user 6b can allow the information terminal 3 to execute an action as intended. When the user 6b changes the touch position P2 to the touch position P2', the display control device 1 displays the shadow image 23a at a position corresponding to the touch position P2' on the first touch screen 21a, so that the user 6a can recognize that the user 6b has performed a swipe operation on the second touch screen 21b. With this configuration, the display control device 1 in the present embodiment can prevent the user 6a from mistaking the action for a malfunction of the first touch screen 21a or the information terminal 3 even when the pinch-out operation by the user 6b enlarges the display image 30 appearing on the first touch screen 21a.

The example illustrated in FIG. 6 is only illustrative of the operation performed by users 6 using different touch screens 21 in cooperation with each other. The use example of the display control system S in the present embodiment is not limited thereto. For example, when users 6 play a game online, the display control system S in the present embodiment may be employed so that the same game screen is operated on different touch screens 21.

Since the display control device 1 in the present embodiment is connected to the information terminal 3 via wireless communication, the location of the information terminal 3 inside the vehicle 4 is not limited.

In the present embodiment, the display control system S includes two display devices (first display device 2a and second display device 2b). However, the number of display devices is not limited thereto. The installation location of the first display device 2a and the second display device 2b is not limited to the example illustrated in FIG. 1. For example, the display control system S in the present embodiment is not necessarily mounted on the vehicle 4.

The information terminal 3 may transmit not only a display image 30 but also music data to the display control device 1. In this case, the display control device 1 transmits music data transmitted from the information terminal 3 to the first display device 2a and the second display device 2b.

In the present embodiment, the second receiver 103 of the display control device 1 receives touch screen identification information that specifies the touch screen 21 being touch-operated. However, the second receiver 103 may determine the touch screen 21 being touch-operated. For example, in the present embodiment, the display control device 1 receives information through different device interfaces 12 for the first display device 2a and the second display device 2b. In this configuration, the second receiver 103 may determine which touch screen 21 has been touch-operated according to the device interface 12 that has received the touch coordinates. For example, the second receiver 103 may determine that the touch coordinates received through the device interface 12a is the touch coordinates indicating the touch position P1 on the first touch screen 21a and may determine that the touch coordinates received through the device interface 12b is the touch coordinates indicating the touch position P1 on the second touch screen 21b.

Second Embodiment

In the foregoing first embodiment, the display control device 1 does not exclude but accepts an operation from another touch screen 21 whichever touch screen 21 is being operated. However, in the present second embodiment, the display control device 1 performs exclusion control for another touch screen 21 when a plurality of points are touch-operated on any one touch screen 21.

The overall configuration of the display control system S in the present embodiment is similar to the configuration in the first embodiment illustrated in FIG. 1. The hardware configuration of the display control device 1, the first display device 2a, and the second display device 2b is similar to the configuration in the first embodiment illustrated in FIG. 2.

Figure 7:
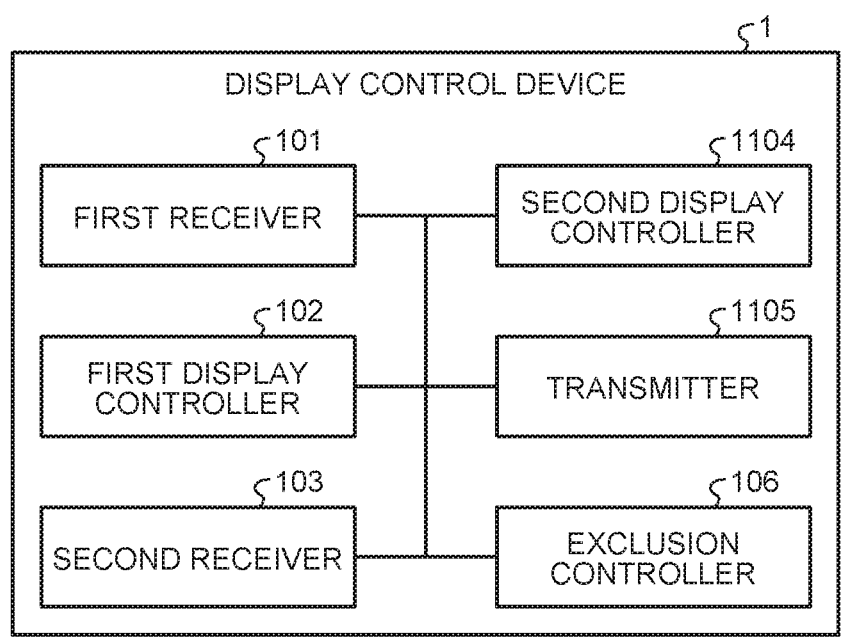
FIG. 7 is a block diagram illustrating an example of the functions of the display control device according to a second embodiment.

FIG. 7 is a block diagram illustrating an example of the functions of the display control device 1 according to the present embodiment. As illustrated in FIG. 7, the display control device 1 in the present embodiment includes a first receiver 101, a first display controller 102, a second receiver 103, a second display controller 1104, a transmitter 1105, and an exclusion controller 106.

As an example, the first receiver 101, the first display controller 102, the second receiver 103, the second display controller 1104, the transmitter 1105, and the exclusion controller 106 are stored as a computer program in a format executable by a computer in the memory 11. The processor 10 reads and executes the computer program from the memory 11 to implement the function corresponding to each of the modules described above.

The first receiver 101, the first display controller 102, and the second receiver 103 have functions similar to those in the first embodiment.

The exclusion controller 106 does not accept an operation on another touch screen 21 when a touch operation is performed at a plurality of points in a range in which a display image 30 is displayed in any one touch screen 21 (that is, when a finger or an object comes into contact with a plurality of points).

More specifically, the exclusion controller 106 counts the points touch-operated in a range of each touch screen 21 in which the display image 30 is displayed and determines whether a touch operation has been performed at a plurality of points in one touch screen 21. When it is determined that a touch operation is performed at a plurality of points in any one touch screen 21, the exclusion controller 106 sends an instruction to the transmitter 1105 to stop transmission of touch coordinates indicating the touch position P on a touch screen 21 other than the touch screen 21 to the information terminal 3. In the present embodiment, this instruction is referred to as instruction of exclusion control.

When it is determined that a touch operation has been performed at a plurality of points in any one touch screen 21, the exclusion controller 106 sends an instruction to the transmitter 1105 to display a message on a touch screen 21 other than the touch screen 21 to indicate that the touch screen 21 is being operated. The details of the message will be described later.

In this way, the exclusion controller 106 does not accept an operation on the second touch screen 21b when a touch operation is performed at a plurality of points in a range in which the display image 30 is displayed in the first touch screen 21a. The exclusion controller 106 does not accept an operation on the first touch screen 21a when a touch operation is performed at a plurality of points in a range in which the display image 30 is displayed in the second touch screen 21b.

The second display controller 1104 in the present embodiment has the functions in the first embodiment and, in addition, when a touch operation is performed at a plurality of points in a range in which the display image 30 is displayed in any one touch screen 21, that is, when the exclusion controller 106 performs exclusion control of the operation on another touch screen 21, the second display controller 1104 displays a message on another touch screen 21 to indicate that the touch screen 21 is being operated.

Specifically, when a touch operation is performed at a plurality of points in a range in which the display image 30 is displayed in the first touch screen 21a, the second display controller 1104 in the present embodiment displays a message on the second touch screen 21b to indicate that the first touch screen 21a is being operated. When a touch operation is performed at a plurality of points in a range in which the display image 30 is displayed in the second touch screen 21b, the second display controller 1104 also displays a message on the first touch screen 21a to indicate that the second touch screen 21b is being operated.

Figure 8:
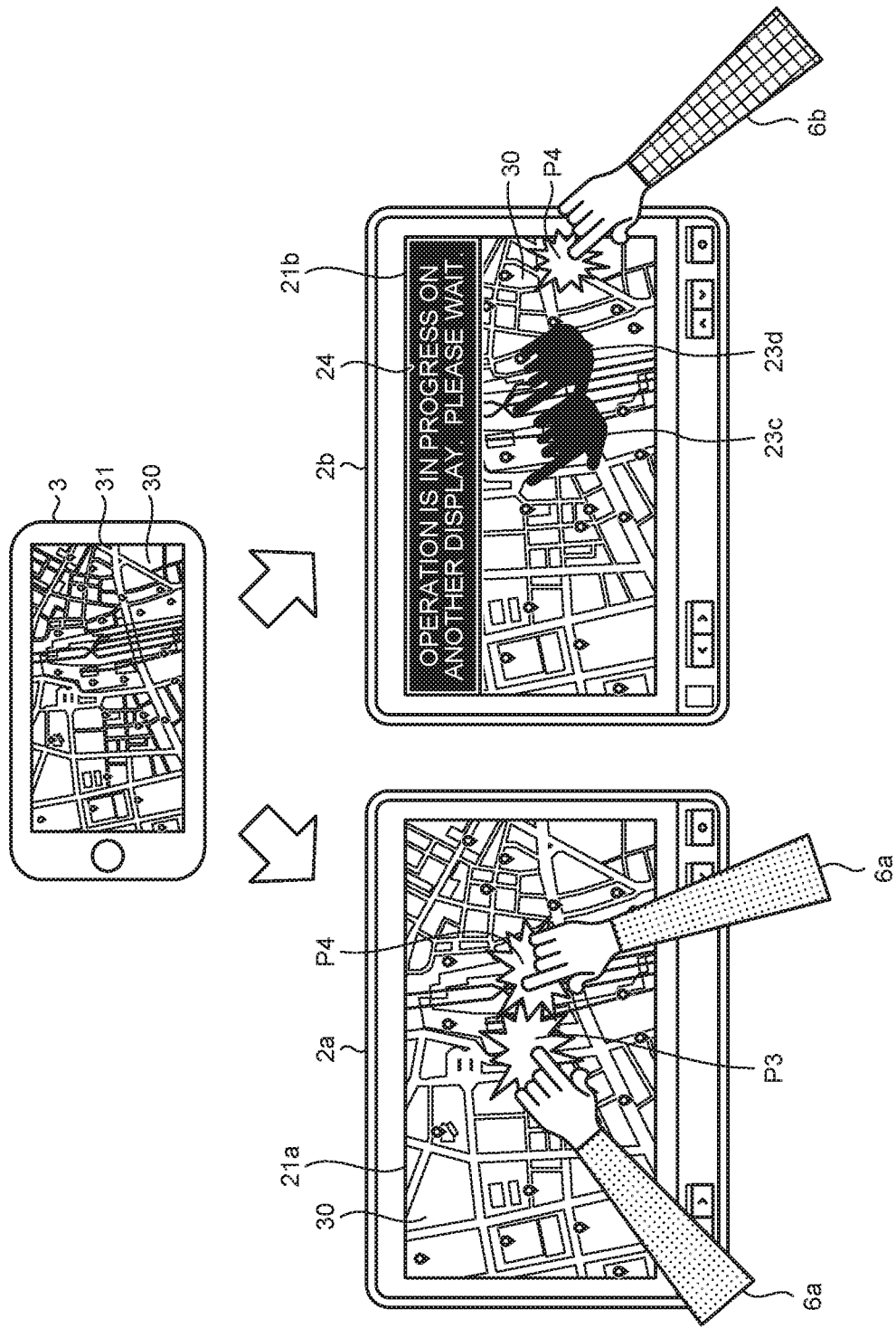
FIG. 8 is a diagram illustrating an example of screen display according to the second embodiment.

FIG. 8 is a diagram illustrating an example of screen display according to the present embodiment. In the example illustrated in FIG. 8, the user 6a performs a touch-operation at a touch position P3 and a touch position P4 in the first touch screen 21a. In this case, the second display controller 1104 controls the second display device 2b to display shadow images 23c and 23d and a message 24 on the second touch screen 21b. The shadow images 23c and 23d are displayed at positions corresponding to the touch coordinates of the touch position P3 and the touch position P4, respectively.

The message 24 is a message indicating that the first touch screen 21a is being operated. In FIG. 8, as an example, "Operation is in progress on another display. Please wait" appears, but the wording of the message 24 is not limited thereto.

Returning to FIG. 7, the transmitter 1105 in the present embodiment includes the functions in the first embodiment and, in addition, when a touch operation is performed at a plurality of points in a range in which the display image 30 is displayed in any one touch screen 21, that is, when the exclusion controller 106 performs exclusion control of the operation of another touch screen 21, the transmitter 1105 stops transmission of touch coordinates indicating a touch position P on a touch screen 21 other than the touch screen 21 to the information terminal 3.

In the example illustrated in FIG. 8, although the user 6b performs a touch-operation at the touch position P4 on the second touch screen 21b, the transmitter 1105 does not transmit the touch coordinates indicating the touch position P4 to the information terminal 3. With this configuration, the operation by the user 6b on the second touch screen 21b undergoes exclusion control. In the example illustrated in FIG. 8, the display control device 1 displays the shadow images 23c and 23d and the message 24 on the second touch screen 21b. However, only the message 24 may be displayed on the second touch screen 21b.

The display control process in the display control system S in the present embodiment configured as described above will now be described.

Figure 9:
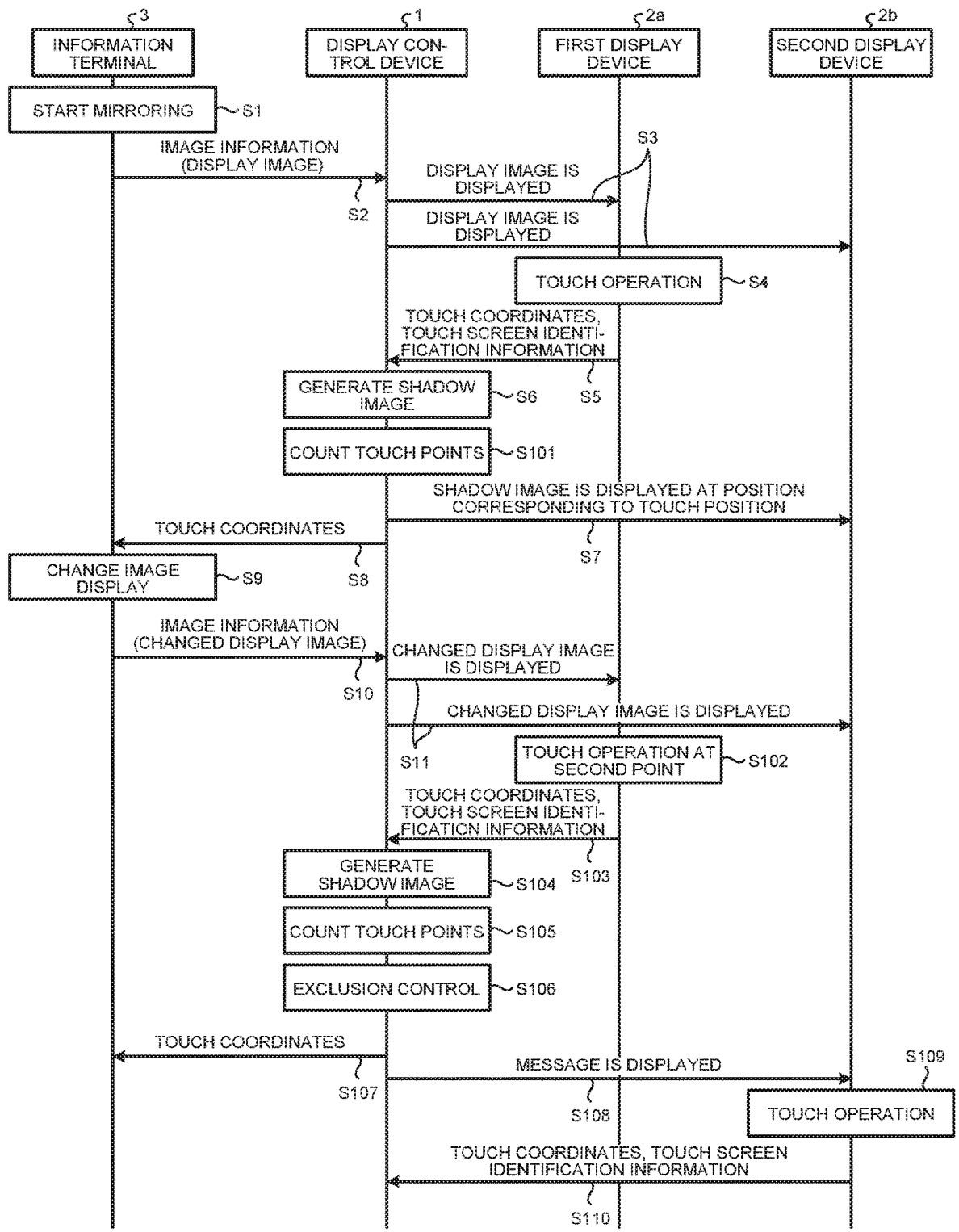
FIG. 9 is a sequence diagram illustrating an example of a display control process in the display control system according to the second embodiment.

FIG. 9 is a sequence diagram illustrating an example of the display control process in the display control system S according to the present embodiment. The process from start of mirroring at S1 to generation of a shadow image 23 at S6 is similar to the process in the first embodiment illustrated in FIG. 5. In the touch operation at S4, it is assumed that the touch position P3 illustrated in FIG. 8 is touch-operated.

The exclusion controller 106 of the display control device 1 in the present embodiment counts the number of touch coordinates transmitted from the first display device 2a to count the number of touch points (contact points) of the first touch screen 21a (S101). At the point of time at S101, the first touch screen 21a is touched at only one point and the exclusion controller 106 does not perform exclusion control.

The process from display of the shadow image 23 (for example, the shadow image 23c illustrated in FIG. 8) at S7 to display of the changed display image 30 at S11 is similar to the process in the first embodiment.

Next, when a second point in the range in which the display image 30 is displayed is touch-operated in the first touch screen 21a of the first display device 2a (S102), the first display device 2a transmits the touch coordinates indicating the touch position P (for example, the touch position P4 illustrated in FIG. 8) in the display image 30 and the touch screen identification information indicating the first touch screen 21a to the display control device 1 (S103). The second receiver 103 of the display control device 1 receives the touch coordinates and the touch screen identification information transmitted from the first display device 2a. The second receiver 103 sends the received touch coordinates and touch screen identification information in association with each other to the exclusion controller 106, the second display controller 1104, and the transmitter 1105.

The process of generating a shadow image at S104 is similar to the process at S6. The exclusion controller 106 then counts the number of touch coordinates transmitted from the first display device 2a to count the number of touch points in the first touch screen 21a (S105). Here, since the touch coordinates indicating two touch positions P3 and P4 in the first touch screen 21a are transmitted from the first display device 2a, the exclusion controller 106 determines that a touch operation has been performed at a plurality of points in the first touch screen 21a. In this case, the exclusion controller 106 starts exclusion control for the second touch screen 21b (S106).

In this case, since an operation on the first touch screen 21a is not restricted, the process of transmitting the touch coordinates in the first touch screen 21a to the information terminal 3 at S107 is performed in the same manner as in S8.

Next, the second display controller 1104 controls the second display device 2b to display the shadow image 23d and the message 24 on the second touch screen 21b (S108).

Here, it is assumed that the user 6b performs a touch-operation at the touch position P4 in a range in which the display image 30 is displayed in the second touch screen 21b (S109). In this case, the second display device 2b transmits the touch coordinates indicating the touch position P4 and the touch screen identification information indicating the second touch screen 21b to the display control device 1 (S110). However, the touch coordinates is not transmitted to the information terminal 3 because the exclusion controller 106 performs exclusion control. The exclusion control by the exclusion controller 106 is terminated, for example, when the first touch screen 21a is touched at one or less point.

In FIG. 9, the first touch screen 21a is touch-operated at a plurality of points. However, when the second touch screen 21b is touch-operated at a plurality of points, the first touch screen 21a undergoes exclusion control. In FIG. 9, the first touch screen 21a is touch-operated at a plurality of points. However, the second touch screen 21b may undergo exclusion control when the first touch screen 21a is touched at only one point.

In this way, in the display control device 1 in the present embodiment, when a touch operation is performed at a plurality of points in a range in which the display image 30 is displayed in the first touch screen 21a, the operation on the second touch screen 21b undergoes exclusion control, and a message 24 indicating that the first touch screen 21a is being operated is displayed on the second touch screen 21b. With this configuration, when the user 6 performs the operation that touches a plurality of points, such as pinch-in or pinch-out, in any one touch screen 21, the display control device 1 in the present embodiment prevents execution of an action unintended by the user 6 because of the operation performed by another user on another touch screen 21. The display control device 1 in the present embodiment displays the message 24 to prevent another user using another touch screen 21 under exclusion control from mistaking the reason for a touch operation not being accepted for a malfunction of another touch screen 21.

First Modification

In the foregoing first and second embodiments, when the user 6 touch-operates the touch screen 21, a shadow image 23 appears on another touch screen 21. However, instead of the shadow image 23, a message may appear to indicate that the touch screen 21 is being touch-operated.

For example, when the first touch screen 21a is being touch-operated, the second display controller 104, 1104 of the display control device 1 may display a message on the second touch screen 21b to indicate that the first touch screen 21a is being touch-operated. In the present modification, the message is an example of the second image.

Second Modification

In the foregoing first and second embodiments, as illustrated in FIG. 2, each function is implemented by one processor 10. However, the hardware configuration of the display control device 1 is not limited thereto.

Figure 10:
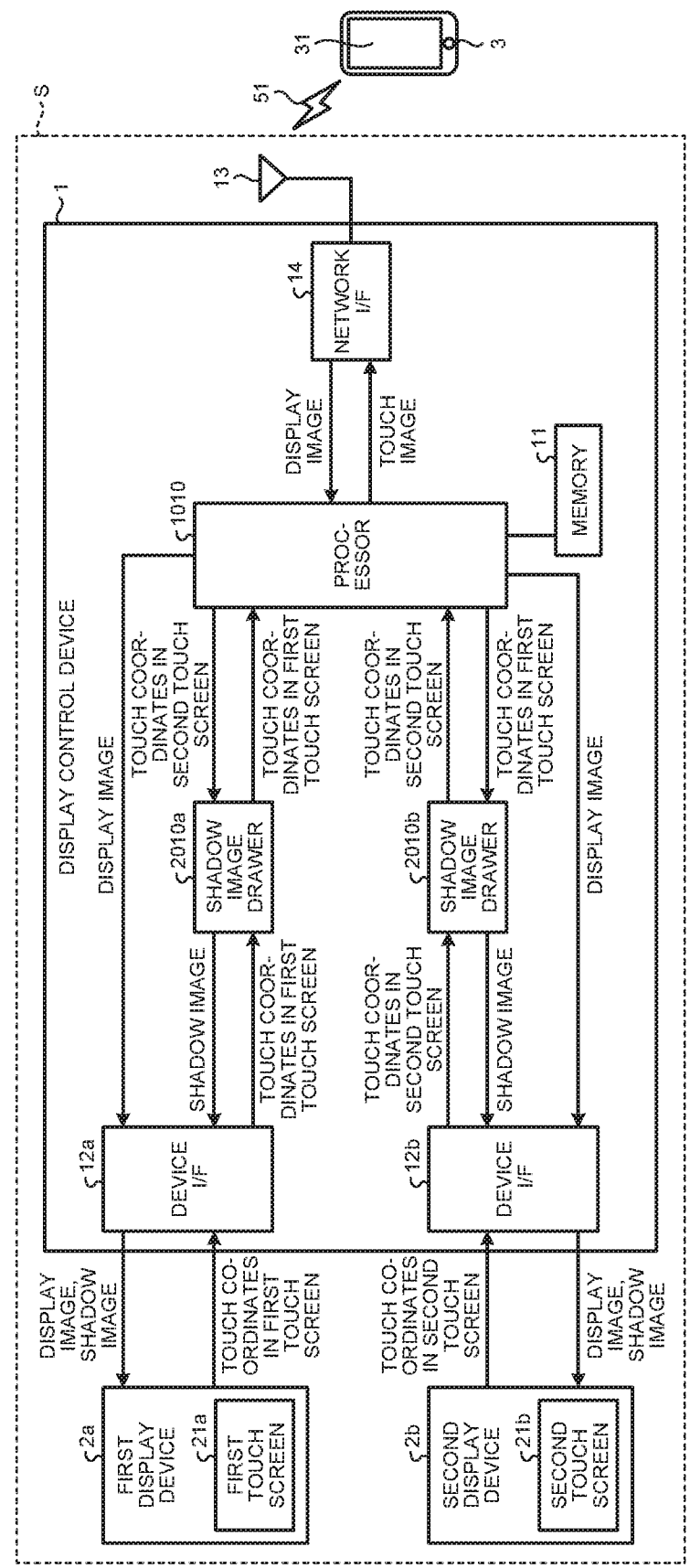
FIG. 10 is a diagram illustrating an exemplary hardware configuration of the display control device according to a second modification.

FIG. 10 is a diagram illustrating an exemplary hardware configuration of the display control device 1 according to the present modification. A processor 1010 in the present modification implements, for example, the functions of the first receiver 101, the first display controller 102, the transmitter 105, 1105, and the exclusion controller 106. A shadow image drawer 2010a and a shadow image drawer 2010b in the present modification are processors and implement, for example, the functions of the second receiver 103 and the second display controller 104, 1104.

The processor 1010 may be called a first processor, the shadow image drawer 2010a may be called a second processor, and the shadow image drawer 2010b may be called a third processor.

The shadow image drawer 2010a in the present embodiment receives the touch coordinates in the first touch screen 21a from the first display device 2a through the device interface 12a and transmits the received touch coordinates to the processor 1010. The shadow image drawer 2010b receives the touch coordinates in the second touch screen 21b from the second display device 2b through the device interface 12b and transmits the received touch coordinates to the processor 1010. The processor 1010 transmits the touch coordinates in the first touch screen 21a transmitted from the shadow image drawer 2010a to the shadow image drawer 2010b. The processor 1010 also transmits the touch coordinates in the second touch screen 21b transmitted from the shadow image drawer 2010b to the shadow image drawer 2010a.

The shadow image drawer 2010a and the shadow image drawer 2010b overlay and display the shadow image 23 at a position corresponding to the touch coordinates on the display image 30, on a touch screen 21 provided in a display device 2 other than the source display device 2 that has transmitted the touch coordinates, in the same manner as in the second display controllers 104 and 1104 in the first and second embodiments.

The configuration for implementing the functions by a plurality of processors is not limited to the example illustrated in FIG. 10.

Third Modification

In the foregoing first and second embodiments, display control of the first touch screen 21a and the second touch screen 21b and generation of a shadow image 23 are performed on the display control device 1 side. However, all or part of these functions may be performed by the first display device 2a and the second display device 2b.

A display control device according to the present disclosure can prevent execution of an action unintended by a user when individual operations are performed on touch screens of a plurality of display devices receiving distribution of an image from one information terminal.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display control device connected to an information terminal including a display, a first display device including a first touch screen, and a second display device including a second touch screen through a network,
the display control device comprising a memory and a processor, wherein
the processor is configured to
receive image information indicating a first image appearing on the display from the information terminal,
control the first display device and the second display device based on the image information to display the first image on the first touch screen and the second touch screen,
receive first coordinate information indicating a contact position on the first image from the first display device when a touch operation that brings a finger or an object into contact is performed in a range in which the first image is displayed in the first touch screen,
overlay and display a second image at a position corresponding to the first coordinate information on the first image displayed on the second touch screen when the first coordinate information is received,
transmit the received first coordinate information to the information terminal, and
display a notification, on the second touch screen, which indicates that the first touch screen is being operated in response to touch operations being performed at a plurality of points in the range in which the first image is displayed in the first touch screen.

2. The display control device according to claim 1, wherein the second image is an image representing that the touch operation has been performed on the first touch screen.

3. The display control device according to claim 1, wherein
the processor is further configured to
receive second coordinate information indicating a contact position on the first image from the second display device when the touch operation is performed in a range in which the first image is displayed in the second touch screen,
overlay and display the second image at a position corresponding to the second coordinate information on the first image displayed on the first touch screen when the second coordinate information is received, and
transmit the received second coordinate information to the information terminal.

4. The display control device according to claim 1, wherein the display control device is connected to the information terminal via wireless communication and connected to the first display device and the second display device via wired communication.

5. The display control device according to claim 1, wherein
the notification is a message, and
the processor is further configured to
accept no touch operation on the second touch screen when touch operations are performed at a plurality of points in the range in which the first image is displayed in the first touch screen, and
display the message on the second touch screen to indicate that the first touch screen is being operated when the touch operations are performed at the plurality of points in the range in which the first image is displayed in the first touch screen.

6. A display control method comprising:
receiving image information indicating a first image appearing on a display from an information terminal including the display;
controlling a first display device including a first touch screen and a second display device including a second touch screen based on the image information to display the first image on the first touch screen and the second touch screen;
receiving first coordinate information indicating a contact position on the first image from the first display device when a touch operation that brings a finger or an object into contact is performed in a range in which the first image is displayed in the first touch screen;
overlaying and displaying a second image at a position corresponding to the first coordinate information on the first image displayed on the second touch screen when the first coordinate information is received;
transmitting the received first coordinate information to the information terminal; and
displaying a notification, on the second touch screen, which indicates that the first touch screen is being operated in response to touch operations being performed at a plurality of points in the range in which the first image is displayed in the first touch screen.

7. A display control method according to claim 6, wherein
the notification is a message, and
the display control method further comprises:
accepting no touch operation on the second touch screen when the touch operations are performed at the plurality of points in the range in which the first image is displayed in the first touch screen, and
displaying the message on the second touch screen to indicate that the first touch screen is being operated when the touch operations are performed at the plurality of points in the range in which the first image is displayed in the first touch screen.

8. A display control system comprising a first display device, a second display device, and a display control device,
the first display device including a first touch screen,
the second display device including a second touch screen,
the display control device including a memory and a processor, wherein
the processor is configured to
receive image information indicating a first image appearing on a display from an information terminal including the display, control the first display device and the second display device based on the image information to display the first image on the first touch screen and the second touch screen, receive first coordinate information indicating a contact position on the first image from the first display device when a touch operation that brings a finger or an object into contact is performed in a range in which the first image is displayed in the first touch screen, overlay and display a second image at a position corresponding to the first coordinate information on the first image displayed on the second touch screen when the first coordinate information is received, transmit the received first coordinate information to the information terminal, and display a notification, on the second touch screen, which indicates that the first touch screen is being operated in response to touch operations being performed at a plurality of points in the range in which the first image is displayed in the first touch screen.

9. A display control system according to claim 8, wherein the notification is a message, and the processor is further configured to accept no touch operation on the second touch screen when the touch operations are performed at the plurality of points in the range in which the first image is displayed in the first touch screen, and display the message on the second touch screen to indicate that the first touch screen is being operated when the touch operations are performed at the plurality of points in the range in which the first image is displayed in the first touch screen.

* * * * *